United States Patent
Hao et al.

(10) Patent No.: US 10,923,899 B2
(45) Date of Patent: Feb. 16, 2021

(54) GROUND FAULT PROTECTION SYSTEM

(71) Applicant: Shanghai Fudan Microelectronics Group Company Limited, Shanghai (CN)

(72) Inventors: Shusen Hao, Shanghai (CN); Yang Liu, Shanghai (CN); Xueqiu Yu, Shanghai (CN)

(73) Assignee: Shanghai Fudan Microelectronics Group Company Limited, Shanghai (CN)

( * ) Notice: Subject to any disclaimer, the term of this patent is extended or adjusted under 35 U.S.C. 154(b) by 354 days.

(21) Appl. No.: 15/926,339

(22) Filed: Mar. 20, 2018

(65) Prior Publication Data
US 2018/0278040 A1 Sep. 27, 2018

(30) Foreign Application Priority Data

Mar. 21, 2017 (CN) .......................... 201710170208.1
Mar. 13, 2018 (CN) .......................... 201810204668.6

(51) Int. Cl.
*H02H 3/04* (2006.01)
*H02H 3/16* (2006.01)
(Continued)

(52) U.S. Cl.
CPC ............ *H02H 3/044* (2013.01); *H02H 3/162* (2013.01); *H02H 3/335* (2013.01); *H02H 1/0007* (2013.01)

(58) Field of Classification Search
CPC ........ H02H 3/044; H02H 3/335; H02H 3/162; H02H 1/0007
(Continued)

(56) References Cited

U.S. PATENT DOCUMENTS

2004/0145842 A1 7/2004 Rice
2010/0013491 A1 1/2010 Hooper et al.
(Continued)

FOREIGN PATENT DOCUMENTS

CN 201219092 Y 4/2009
CN 101983465 A 3/2011
(Continued)

OTHER PUBLICATIONS

CN-102306924, Specification, Drawings, (Year: 2012).*
(Continued)

*Primary Examiner* — Dharti H Patel
(74) *Attorney, Agent, or Firm* — Blank Rome LLP

(57) ABSTRACT

A ground fault protection system is provided. A ground fault protection device includes a current transformer module, a detection coil module and a ground fault circuit interrupter, wherein the current transformer module includes a current transformer, the detection coil module includes a detection coil, a hot and neutral penetrate through the current transformer and the detection coil, the current transformer module outputs a mutual inductance current, when the current transformer and the detection coil form mutual inductance and form a current path with the ground fault circuit interrupter, the ground fault circuit interrupter outputs a disconnection control signal to disconnect connection of the hot and neutral with a load based on the mutual inductance current, and a detection circuit includes a signal generation module which outputs a test signal including at least one pulse signal in one cycle of an AC signal.

16 Claims, 2 Drawing Sheets

(51) Int. Cl.
*H02H 3/33* (2006.01)
*H02H 1/00* (2006.01)

(58) Field of Classification Search
USPC ........................................... 361/42–50
See application file for complete search history.

(56) References Cited

U.S. PATENT DOCUMENTS

2012/0007621 A1* 1/2012 Yue ................. H02H 3/335
 324/750.3
2012/0257314 A1  10/2012 Armstrong

FOREIGN PATENT DOCUMENTS

| CN | 102306924 A | 1/2012 |
|---|---|---|
| CN | 102315621 A | 1/2012 |
| CN | 102694364 A | 9/2012 |
| CN | 105759162 A | 7/2016 |
| EP | 1437813 A2 | 7/2004 |

OTHER PUBLICATIONS

CN-102315621, Specification, Drawings (Year: 2009).*
English translation; China Published Application No. CN102306924; Publication Date: Jan. 4, 2012; 27 pages.
English translation; China Published Application No. CN101983465; Publication Date: Mar. 2, 2011; 19 pages.
English translation; China Published Application No. CN201219092; Publication Date: Apr. 8, 2009; 14 pages.
English translation; China Published Application No. CN102315621; Publication Date: Jan. 11, 2012; 17 pages.
Translated First Office Action in priority application; China Application No. 201810204668.6; dated Mar. 15, 2019; 14 pages.
English translation; China Application No. 102694364; Publication Date Sep. 26, 2012; 26 pages.

* cited by examiner

GROUND FAULT PROTECTION SYSTEM

CROSS-REFERENCE TO RELATED APPLICATIONS

This application claims the benefit of priority to Chinese Patent Application No. 201710170208.1, filed on Mar. 21, 2017, and entitled "GROUND FAULT PROTECTION CIRCUIT" and Chinese Patent Application No. 201810204668.6, filed on Mar. 13, 2018, and entitled "GROUND FAULT PROTECTION SYSTEM", the entire disclosure of which are incorporated herein by reference.

TECHNICAL FIELD

The present disclosure generally relates to electronic technology field, and more particularly, to a ground fault protection system.

BACKGROUND

In a power supply system, to avoid safety issues such as electrocution caused by aging of lines, fault and the like at a load, a residual current interrupter with a leakage protection function is usually provided at a node which is connected with the load. The residual current interrupter detects a residual current. If the residual current is greater than a predetermined threshold, the residual current interrupter makes its internal mechanical device be tripped, and disconnects a power supply of the load, so as to protect a person and equipment.

However, a more reliable protection method is using a ground fault circuit interrupter (GFCI). Such interrupter can not only detect hot-to-ground leakage faults, but also detect grounded neutral faults.

To verify an operating status of the ground fault circuit interrupter, a test button is generally provided on the interrupter. The test button is periodically pressed to detect whether the interrupter can normally operate. However, in practice, terminal users rarely conduct this detection periodically.

SUMMARY

Embodiments of the present disclosure realize automatic detection of a ground fault circuit interrupter.

In an embodiment, a ground fault protection system is provided, including a ground fault protection device and a detection circuit. The ground fault protection device includes a current transformer module, a detection coil module and a ground fault circuit interrupter which connects the current transformer module with the detection coil module, wherein the current transformer module includes a current transformer, the detection coil module includes a detection coil, and a hot and a neutral provide an alternating current signal and penetrate through the current transformer and the detection coil, wherein the current transformer module is configured to output a mutual inductance current to the ground fault circuit interrupter, when the current transformer and the detection coil form mutual inductance and form a current path with the ground fault circuit interrupter, wherein the ground fault circuit interrupter is configured to output a disconnection control signal to disconnect connection of the hot and the neutral with a load based on the mutual inductance current, wherein the detection circuit includes a signal generation module, wherein the signal generation module is configured to output a test signal which includes at least one pulse signal in one cycle of the alternating current signal, wherein the pulse signal enables the mutual inductance to be formed between the current transformer and the detection coil.

Optionally, the ground fault circuit interrupter is configured to calculate a duration of a residual current or the mutual inductance current received after a reset releases, and output the disconnection control signal when the calculated duration is longer than a fault action delay.

Optionally, an accumulated duration of the at least one pulse signal is longer than the fault action delay, the at least one pulse signal includes a pulse signal corresponding to a positive half-cycle of the alternating current signal and a pulse signal corresponding to a negative half-cycle of the alternating current signal, an accumulated duration of the pulse signal corresponding to the positive half-cycle of the alternating current signal is shorter than the fault action delay, and an accumulated duration of the pulse signal corresponding to the negative half-cycle of the alternating current signal is shorter than the fault action delay.

Optionally, the ground fault protection device further includes a power supply module, wherein the power supply module is configured to provide a first power supply voltage greater than or equal to a power supply voltage reset threshold to a power terminal of the ground fault circuit interrupter when the power supply module operates normally, and provide a second power supply voltage less than or equal to the power supply voltage reset threshold to the power terminal of the ground fault circuit interrupter when there is a fault in the power supply module; and the ground fault circuit interrupter is configured to be reset when the power terminal of the ground fault circuit interrupter receives the second power supply voltage.

Optionally, the ground fault protection device further includes a power supply module which includes a full-bridge rectifier circuit and a first RC circuit, wherein a first input terminal of the full-bridge rectifier circuit is coupled with the hot, a second input terminal of the full-bridge rectifier circuit is coupled with the neutral, a first output terminal of the full-bridge rectifier circuit is coupled with a first terminal of the first RC circuit, and a second output terminal of the full-bridge rectifier circuit is grounded; the first RC circuit includes a first resistor and a first capacitor, wherein a first terminal of the first resistor is coupled with the first terminal of the first RC circuit, a second terminal of the first resistor is coupled with a first terminal of the first capacitor and a power terminal of the ground fault circuit interrupter, and a second terminal of the first capacitor is grounded; and the ground fault circuit interrupter is configured to be reset when a voltage of the power terminal of the ground fault circuit interrupter is less than or equal to a power supply voltage reset threshold.

Optionally, the full-bridge rectifier circuit includes a first diode, a second diode, a third diode and a fourth diode, wherein an anode of the first diode is coupled with a cathode of the second diode and the second input terminal of the full-bridge rectifier circuit, and a cathode of the first diode is coupled with a cathode of the fourth diode and the first output terminal of the full-bridge rectifier circuit; an anode of the second diode is coupled with an anode of the third diode and the second output terminal of the full-bridge rectifier circuit; and a cathode of the third diode is coupled with an anode of the fourth diode and the first input terminal of the full-bridge rectifier circuit.

Optionally, the ground fault protection device further includes a tripping module which includes a silicon controlled rectifier, a fifth diode, a tripping coil and a contact switch, wherein a gate of the silicon controlled rectifier is configured to receive the disconnection control signal, an anode of the silicon controlled rectifier is coupled with a cathode of the fifth diode, and a cathode of the silicon controlled rectifier is grounded; an anode of the fifth diode is coupled with a first terminal of the tripping coil; a second terminal of the tripping coil is coupled with the hot; and the contact switch is disposed on the hot and the neutral, and configured to disconnect the connection of the hot and the neutral with the load when the tripping coil is powered on.

Optionally, the detection circuit further includes a detection module which is configured to detect whether the disconnection control signal is output by the ground fault circuit interrupter.

Optionally, the detection module is configured to output a detection current in a negative half-cycle of the alternating current signal to detect whether the disconnection control signal is output by the ground fault circuit interrupter.

Optionally, the ground fault protection device further includes a tripping module which includes a silicon controlled rectifier, a fifth diode, a tripping coil and a contact switch, wherein a gate of the silicon controlled rectifier is configured to receive the disconnection control signal, an anode of the silicon controlled rectifier is coupled with a cathode of the fifth diode and a detection pin, and a cathode of the silicon controlled rectifier is grounded; an anode of the fifth diode is coupled with a first terminal of the tripping coil; a second terminal of the tripping coil is coupled with the hot; the contact switch is disposed on the hot and the neutral, and configured to disconnect the connection of the hot and the neutral with the load when the tripping coil is powered on; and the detection pin is configured to receive the detection current.

Optionally, the detection module is configured to obtain a load resistance status of the detection pin based on the detection current, to detect whether the disconnection control signal is output by the ground fault circuit interrupter.

Optionally, the detection circuit further includes an alarming module which is configured to generate an alarm when the detection module detects that the ground fault circuit interrupter does not output the disconnection control signal.

Optionally, the signal generation module includes a zero-crossing detection module and a signal generator, wherein the zero-crossing detection module is configured to output a zero-crossing pulse signal when a zero-crossing point of the hot relative to the neutral is detected; and the signal generator is configured to generate the at least one pulse signal after receiving the zero-crossing pulse signal.

Optionally, the detection circuit further includes a detection module which is configured to output a detection current to detect whether the disconnection control signal is output by the ground fault circuit interrupter.

Optionally, the detection circuit further includes a controllable switch and a signal transmission line, wherein a control terminal of the controllable switch is configured to receive the test signal, a first connection terminal of the controllable switch is coupled with a first connection point of the signal transmission line, and a second connection terminal of the controllable switch is grounded; a second connection point of the signal transmission line is coupled with the second connection terminal of the controllable switch; and the signal transmission line between the first connection point and the second connection point penetrates through the current transformer and the detection coil.

Optionally, the neutral may further serve as the signal transmission line.

In embodiments of the present disclosure, the signal generation module generates a test signal for simulating a fault, and the current transformer and the detection coil form mutual inductance under the drive of the test signal. When components of the current transformer module, the detection coil module and the ground fault circuit interrupter are normal, the test signal makes the current transformer, the detection coil and the ground fault circuit interrupter form a positive feedback loop. The ground fault circuit interrupter produces self-excited oscillation internally, and the current transformer module outputs the mutual inductance current to the ground fault circuit interrupter. The ground fault circuit interrupter may output the disconnection control signal according to the mutual inductance current. Therefore, when the disconnection control signal is detected, it is indicated that there is no fault in the ground fault protection device including the ground fault circuit interrupter. In this way, automatic detection of the ground fault circuit interrupter is realized.

DETAILED DESCRIPTION

In order to clarify the object, solutions and advantages of embodiments of the present disclosure, embodiments of present disclosure will be described explicitly in detail in conjunction with accompanying drawings.

Figure 1:
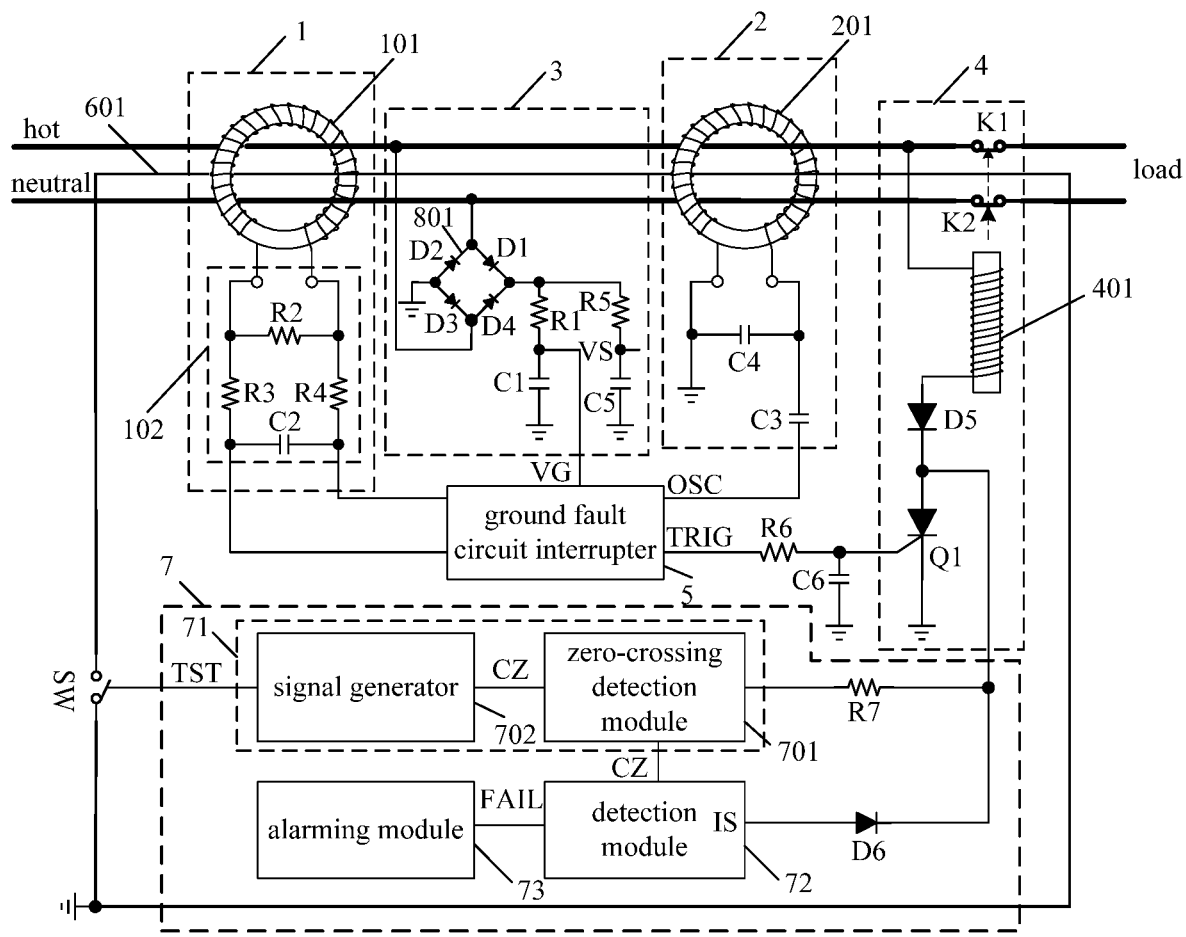
FIG. 1 schematically illustrates a structural diagram of a ground fault protection system according to an embodiment.

Referring to FIG. 1, in an embodiment, a ground fault protection system is provided.

The ground fault protection system includes a ground fault protection device and a detection circuit.

The ground fault protection device includes a current transformer module 1, a detection coil module 2 and a ground fault circuit interrupter 5 which connects the current transformer module 1 with the detection coil module 2.

The current transformer module 1 includes a current transformer 101, and the detection coil module 2 includes a detection coil 201. A hot and a neutral provide an alternating current signal and penetrate through the current transformer 101 and the detection coil 201.

The current transformer module 1 is configured to output a mutual inductance current to the ground fault circuit interrupter 5, when the current transformer 101 and the detection coil 201 form mutual inductance and form a current path with the ground fault circuit interrupter 5. The ground fault circuit interrupter 5 is configured to output a disconnection control signal to disconnect connection of the hot and the neutral with a load based on the mutual inductance current. The current path is a positive feedback loop.

The detection circuit includes a signal generation module 71, wherein the signal generation module 71 is configured to output a test signal TST which includes at least one pulse signal in one cycle of the alternating current signal, wherein the pulse signal enables the mutual inductance to be formed between the current transformer 101 and the detection coil 201.

In embodiments of the present disclosure, the signal generation module 71 generates a test signal TST for simulating a fault, and the current transformer 101 and the detection coil 201 form mutual inductance under the drive of the test signal TST. When components of the current transformer module 1, the detection coil module 2 and the ground fault circuit interrupter 5 are normal, the current transformer 101, the detection coil 201 and the ground fault circuit interrupter 5 form a positive feedback loop. The ground fault circuit interrupter 5 produces self-excited oscillation internally, causing a pin OSC of the ground fault circuit interrupter 5 to output an oscillation signal. The oscillation signal causes, via a mutual inductance function between the detection coil 201 and the current transformer 101, the current transformer module 11 to output the mutual inductance current to the ground fault circuit interrupter 5. The ground fault circuit interrupter 5 may output the disconnection control signal according to the mutual inductance current. Therefore, when the disconnection control signal is detected, it is indicated that there is no fault in each component of the ground fault protection device. In this way, automatic detection of the ground fault protection device is realized.

In some embodiments, the current transformer module 1 may further not output the mutual inductance current to the ground fault circuit interrupter 5 when the current transformer 101 and the detection coil 201 fail to form a positive feedback loop with the ground fault circuit interrupter 5. The ground fault circuit interrupter 5 does not output the disconnection control signal if not receiving the mutual inductance current.

When there is a fault in a particular part of the current transformer module 1, the detection coil module 2 and the ground fault circuit interrupter 5 in the ground fault protection device, even if the current transformer 101 and the detection coil 201 form mutual inductance, the current transformer 101 and the detection coil 201 cannot form a positive feedback loop with the ground fault circuit interrupter 5 via the particular part, and further cannot generate a mutual inductance current. Therefore, in this situation, the current transformer module 11 does not output the mutual inductance current to the ground fault circuit interrupter 5, and accordingly, the ground fault circuit interrupter 5 does not output the disconnection control signal. Therefore, when the disconnection control signal cannot be detected, it is indicated that there is a fault in a particular part of the ground fault protection device. In this way, fault detection of the ground fault protection device is realized.

The ground fault protection system in the embodiment is further described in detail below.

The current transformer module 1 may include the current transformer 101 which is directly coupled with an input terminal of the ground fault circuit interrupter 5. In some embodiments, the current transformer module 1 may include the current transformer 101 and a first filter circuit 102, wherein the current transformer 101 is coupled with the input terminal of the ground fault circuit interrupter 5 via the first filter circuit 102.

The first filter circuit 102 includes a second resistor R2, a third resistor R3, a fourth resistor R4 and a second capacitor C2. A first terminal of the second resistor R2 is coupled with a first connection terminal of the current transformer 101 and a first terminal of the third resistor R3. A second terminal of the second resistor R2 is coupled with a second connection terminal of the current transformer 101 and a first terminal of the fourth resistor R4. A second terminal of the third resistor R3 is coupled with a first terminal of the second capacitor C2 and a first input terminal of the ground fault circuit interrupter 5. A second terminal of the fourth resistor R4 is coupled with a second terminal of the second capacitor C2 and a second input terminal of the ground fault circuit interrupter 5.

The detection coil module 2 may include the detection coil 201 and a third capacitor C3. A first connection terminal of the detection coil 201 is grounded, a second connection terminal of the detection coil 201 is coupled with a first terminal of the third capacitor C3, and a second terminal of the third capacitor C3 is coupled with the pin OSC of the ground fault circuit interrupter 5.

In some embodiments, the detection coil module 2 may include the detection coil 201, the third capacitor C3 and a fourth capacitor C4 for regulating frequency of self-excited oscillation. A first terminal of the fourth capacitor C4 is coupled with the first connection terminal of the detection coil 201, and a second terminal of the fourth capacitor C4 is coupled with the first terminal of the third capacitor C3.

The ground fault protection device may further include a power supply module 3 which includes a full-bridge rectifier circuit 801, a first RC circuit and a second RC circuit.

The full-bridge rectifier circuit 801 may include a first diode D1, a second diode D2, a third diode D3 and a fourth diode D4, wherein an anode of the first diode D1 is coupled with a cathode of the second diode D2 and the neutral, and a cathode of the first diode D1 is coupled with a cathode of the fourth diode D4 and a first terminal of the first RC circuit; an anode of the second diode D2 is coupled with an anode of the third diode D3 and the ground; and a cathode of the third diode D3 is coupled with an anode of the fourth diode D4 and the neutral.

The first RC circuit includes a first resistor R1 and a first capacitor C1, wherein a first terminal of the first resistor R1 is coupled with the first terminal of the first RC circuit, a second terminal of the first resistor R1 is coupled with a first terminal of the first capacitor C1 and a power terminal VG of the ground fault circuit interrupter 5, and a second terminal of the first capacitor C1 is grounded.

The second RC circuit includes a fifth resistor R5 and a fifth capacitor C5, wherein a first terminal of the fifth resistor R5 is coupled with the first terminal of the first RC circuit, a second terminal of the fifth resistor R5 is coupled with a first terminal of the fifth capacitor C5 and configured to provide a power supply voltage VS required by the detection circuit, and a second terminal of the fifth capacitor C5 is grounded.

The ground fault protection device may further include a tripping module 4 which includes a silicon controlled rectifier Q1, a fifth diode D5, a tripping coil 401, a first contact switch K1 and a second contact switch K2.

A gate of the silicon controlled rectifier Q1 is coupled with a pin TRIG of the ground fault circuit interrupter 5, and configured to receive the disconnection control signal, an anode of the silicon controlled rectifier Q1 is coupled with a cathode of the fifth diode D5, and a cathode of the silicon controlled rectifier Q1 is grounded. An anode of the fifth diode D5 is coupled with a first terminal of the tripping coil 401, and a second terminal of the tripping coil 401 is coupled with the hot. The first contact switch K1 is disposed on the hot, and the second contact switch K2 is disposed on the neutral. The first contact switch K1 is configured to disconnect the connection of the hot with the load when the tripping coil 401 is powered on, and the second contact switch K2 is configured to disconnect the connection of the neutral with the load when the tripping coil 401 is powered on.

In some embodiments, the gate of the silicon controlled rectifier Q1 may be coupled with the pin TRIG of the ground fault circuit interrupter 5 via a second filter circuit which includes a sixth resistor R6 and a sixth capacitor C6. A first terminal of the sixth resistor R6 is coupled with the pin TRIG of the ground fault circuit interrupter 5, a second terminal of the sixth resistor R6 is coupled with a first terminal of the sixth capacitor C6 and the gate of the silicon controlled rectifier Q1, and a second terminal of the sixth capacitor C6 is grounded.

The ground fault circuit interrupter 5 may be reset when a voltage of the power terminal VG of the ground fault circuit interrupter 5 is less than or equal to a power supply voltage reset threshold. When the ground fault circuit interrupter 5 is reset, a fault time delay counter in the ground fault circuit interrupter 5 is reset. The fault time delay counter is used to calculate a duration T1 of a residual current or a mutual inductance current. The residual current is a leakage current of the hot to ground, which is well known to those skilled in the art. When the voltage of the power terminal VG is greater than the power supply reset threshold voltage, the reset is released. After the reset is released, the ground fault circuit interrupter 5 may calculate the duration T1 of the received residual current or the received mutual inductance current. If the duration T1 is greater than a fault action delay Tth, the disconnection control signal is output via the pin TRIG The fault action delay Tth is a time period from a time point when the ground fault circuit interrupter 5 in normal operation detects a fault to a time point when the ground fault circuit interrupter 5 outputs a disconnection control signal, and is generally a time period known to those skilled in the art.

Figure 2:
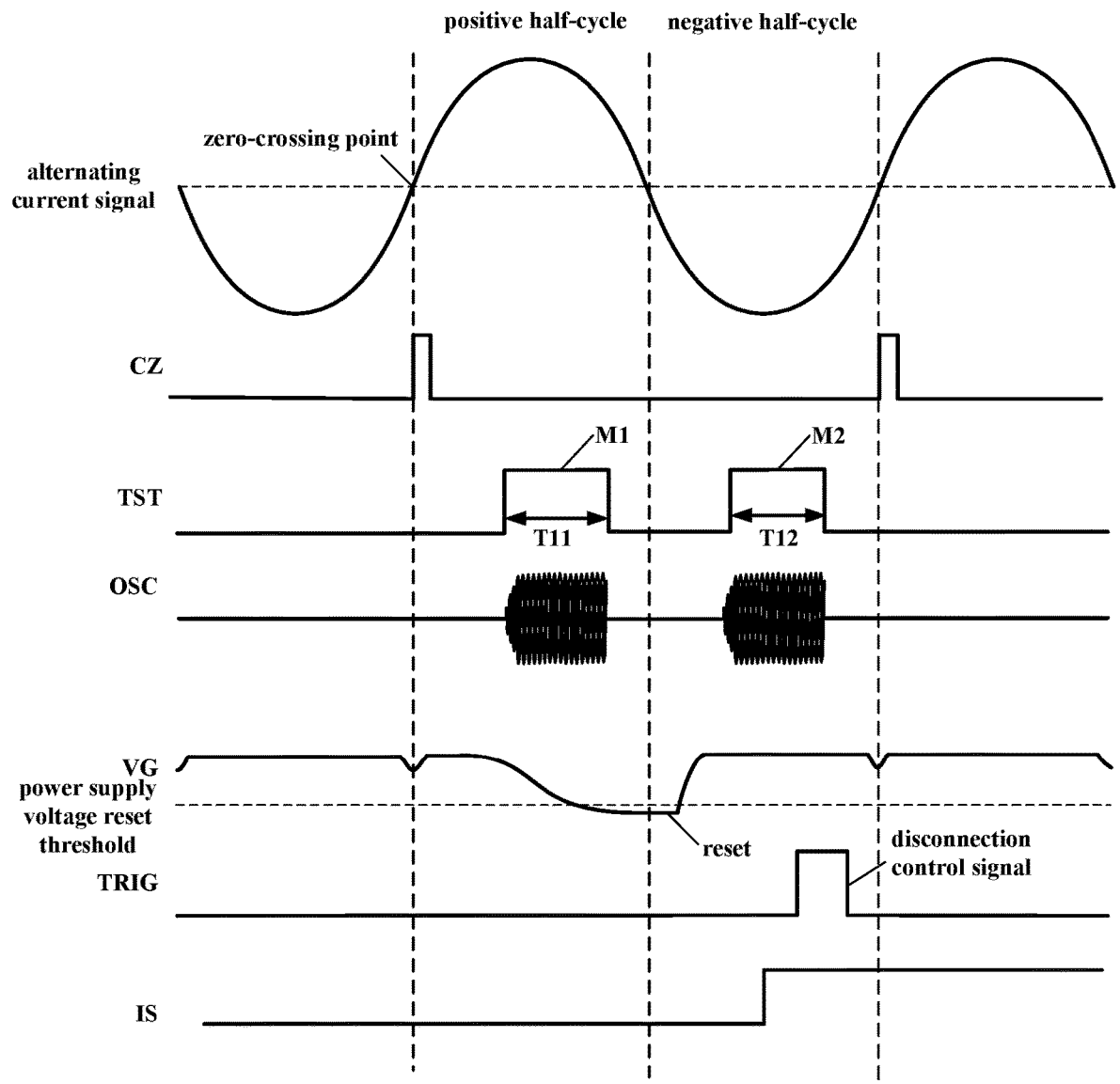
FIG. 2 schematically illustrates waveforms associated with a ground fault protection system according to an embodiment.

As shown in FIG. 2, the test signal TST may include: a first pulse signal M1 corresponding to a positive half-cycle of the alternating current signal and a second pulse signal M2 corresponding to a negative half-cycle of the alternating current signal. A duration T11 of the first pulse signal M1 is shorter than the fault action delay Tth, a duration T12 of the second pulse signal M2 is also shorter than the fault action delay Tth, and a sum of the duration T11 of the first pulse signal M1 and the duration T12 of the second pulse signal M2 is longer than the fault action delay Tth.

The first pulse signal M1 and the second pulse signal M2 cause the current transformer 101 and the detection coil 201 to produce mutual inductance. When there is no fault in the current transformer module 1, the detection coil module 2 and the ground fault circuit interrupter 5, the current transformer module 1 outputs the mutual inductance current. Therefore, the duration T1 of the mutual inductance current is equal to a sum of the duration T11 of the first pulse signal M1 and the duration T12 of the second pulse signal M2.

When there is a fault in the second diode D2 or the fourth diode D4, that is, an open circuit occurs, in the positive half-cycle of the alternating current signal, the full-bridge rectifier circuit 801 cannot provide a power supply voltage to the power terminal VG of the ground fault circuit interrupter 5, and the power supply voltage is provided to the power terminal VG of the ground fault circuit interrupter 5 only by charges stored on the first capacitor C1. The signal generation module 71 produces the first pulse signal M1 in the positive half-cycle of the alternating current signal, to cause the ground fault circuit interrupter 5 to form a positive feedback loop with the current transformer module 1 and the detection coil module 2, which results in a self-excited oscillation inside the ground fault circuit interrupter 5. The pin OSC of the ground fault circuit interrupter 5 outputs an oscillation signal. As the ground fault circuit interrupter 5 needs a relatively large current to maintain the self-excited oscillation, the voltage of the power terminal VG rapidly drops down to the power supply voltage reset threshold, which causes the fault time delay counter in the ground fault circuit interrupter 5 to be reset.

In the negative half-cycle of the alternating current signal, the full-bridge rectifier circuit 801 restores supplying power to the power terminal VG of the ground fault circuit interrupter 5. However, as the ground fault circuit interrupter 5 is reset and the fault time delay counter inside it is reset, after the reset release, the ground fault circuit interrupter 5 only calculates the duration of the mutual inductance current corresponding to the second pulse signal M2. However, the duration of the mutual inductance current corresponding to the second pulse signal M2 is shorter than the fault action delay Tth. Therefore, the ground fault circuit interrupter may not output the disconnection control signal.

A situation when there is a fault in the first diode D1 or in the third diode D3 is similar to the above situation when there is a fault in the second diode D2 or in the fourth diode D4. Only in the positive half-cycle of the alternating current signal, the mutual inductance current corresponding to the first pulse signal M1 is input to the ground fault circuit interrupter 5. While in the negative half-cycle of the alternating current signal, due to the fault of the first diode D1 or the third diode D3, the voltage of the power terminal VG drops rapidly, which makes the ground fault circuit interrupter 5 and its internal fault time delay counter be reset. The duration of the mutual inductance current after the reset release is obviously shorter than the fault action delay Tth. Therefore, the ground fault circuit interrupter may not output the disconnection control signal as well.

From above, embodiments of the present disclosure not only achieve fault detection of the ground fault circuit interrupter 5, the current transformer module 1 and the detection coil module 2, but also achieve fault detection of the power supply module 3.

Still referring to FIG. 1, the signal generation module 71 may include a zero-crossing detection module 701 and a signal generator 702. The zero-crossing detection module 701 is configured to output a zero-crossing pulse signal CZ when a zero-crossing point of the hot relative to the neutral is detected. The signal generator 702 is configured to generate the at least one pulse signal after receiving the zero-crossing pulse signal CZ.

The zero-crossing detection module 701 may be coupled with the anode of the silicon controlled rectifier Q1 via a seventh resistor R7 which has a current limiting function. The fifth diode D5 is conductive in the positive half-cycle of the alternating current signal. In this condition, a signal on the hot may flow to the zero-crossing detection module 701 via the tripping coil 401, the conductive fifth diode D5 and the seventh resistor R7, and the zero-crossing detection module 701 may detect a zero-crossing point of the hot relative to the neutral based on the signal.

The detection circuit may further include a detection module 72. After receiving the zero-crossing pulse signal CZ, the detection module 72 is configured to output a detection current through its detection pin IS in the negative half-cycle of the alternating current signal, to detect whether the disconnection control signal is output by the ground fault circuit interrupter 5.

In some embodiments, the detection module 72 is configured to obtain a load resistance status of the detection pin IS based on the detection current, to detect whether the disconnection control signal is output by the ground fault circuit interrupter 5.

In some embodiments, the detection pin IS of the detection module 72 is coupled with the cathode of the fifth diode D5, or the detection module 72 may be coupled with the cathode of the fifth diode D5 via the diode D6.

When the ground fault protection device does not have a fault, the ground fault circuit interrupter 5 outputs the disconnection control signal at the pin TRIG according to the test signal TST, and the silicon controlled rectifier Q1 is conductive. After receiving the zero-crossing pulse signal CZ, the detection module 72 outputs a detection current through the detection pin IS in the negative half-cycle of the alternating current signal, wherein a voltage of the detection pin IS is a high level at this point. The conductive silicon controlled rectifier Q1 causes load resistance of the detection pin IS to change from a high impedance state to a low impedance state, so that the detection pin IS is pulled down from the high level to a low level, generating a pulse.

When the ground fault protection device has a fault, the ground fault circuit interrupter 5 does not output the disconnection control signal at the pin TRIG according to the test signal TST, and the silicon controlled rectifier Q1 is cut-off. After receiving the zero-crossing pulse signal CZ, the detection module 72 outputs a detection current through the detection pin IS in the negative half-cycle of the alternating current signal, wherein the voltage of the detection pin IS is a high level at this point. The cut-off silicon controlled rectifier Q1 causes load resistance of the detection pin IS to remain in a high impedance state, so that the voltage of the detection pin IS also remains at the high level.

From above, by detecting the voltage of the detection pin IS, the load resistance state of the detection pin IS is determined, so as to determine whether there is a fault in the ground fault protection device.

Still referring to FIG. 2, it should be noted that, the generation of the disconnection control signal based on the test signal TST occurs in the negative half-cycle of the alternating current signal. Although the disconnection control signal makes the silicon controlled rectifier Q1 conductive, a voltage of the hot is lower than a voltage of the neutral in the negative half-cycle, which makes the fifth diode D5 in a cut-off state. Therefore, during a test period, even if the silicon controlled rectifier Q1 is conductive, no current is caused on the tripping coil 401, and the first contact switch K1 and the second contact switch K2 may not disconnect the load, which achieves a test of the ground fault protection device without disconnecting the load.

The detection circuit may further include an alarming module 73 which is configured to generate an alarm when the detection module 72 detects that the ground fault circuit interrupter 5 does not output the disconnection control signal.

In some embodiments, the alarming module 73 may include an LED drive module and an LED lamp module. When detecting that the ground fault circuit interrupter 5 does not output the disconnection control signal, the detection module 72 may output an alarm signal FAIL to the LED drive module. After receiving the alarm signal FAIL, the LED drive module outputs a square wave signal to the LED lamp module, to drive the LED lamp module to emit a flashing visual alarm signal. The square wave signal may have frequency of 3 Hz.

Referring to FIG. 1, the detection circuit may further include a controllable switch SW and a signal transmission line 601.

A control terminal of the controllable switch SW is configured to receive the test signal TST, a first connection terminal of the controllable switch SW is coupled with a first connection point of the signal transmission line 601, and a second connection terminal of the controllable switch SW is grounded. A second connection point of the signal transmission line 601 is coupled with the second connection terminal of the controllable switch SW. The signal transmission line 601 between the first connection point and the second connection point penetrates through the current transformer 101 and the detection coil 201. The controllable switch SW is conductive in a duration of a pulse signal of the test signal TST, which makes the signal transmission line 601 penetrating through the current transformer 101 and the detection coil 201 form a closed loop with the controllable switch SW.

In some embodiments, the neutral may further serve as the signal transmission line. That is, the first connection terminal and the second connection terminal of the controllable switch SW are coupled with the two connection points of the neutral, and the neutral between the two connection points penetrates through the current transformer 101 and the detection coil 201. The controllable switch SW may be a semiconductor device with a switching characteristic, such as an NMOS transistor, an NPN triode or a silicon controlled rectifier, with conductive resistance less than or equal to 10 Ω.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A ground fault protection system, comprising a ground fault protection device and a detection circuit,
   wherein the ground fault protection device comprises a current transformer module, a detection coil module and a ground fault circuit interrupter which connects the current transformer module with the detection coil module,
   wherein the current transformer module comprises a current transformer, the detection coil module comprises a detection coil, and a hot and a neutral provide an alternating current signal and penetrate through the current transformer and the detection coil;
   the current transformer module is configured to output a mutual inductance current to the ground fault circuit interrupter, when the current transformer and the detection coil form mutual inductance and form a current path with the ground fault circuit interrupter; and
   the ground fault circuit interrupter is configured to output a disconnection control signal to disconnect connection of the hot and the neutral with a load based on the mutual inductance current,
   wherein the detection circuit comprises a signal generation module,
   wherein the signal generation module is configured to output a test signal which comprises at least one pulse signal in one cycle of the alternating current signal, wherein the pulse signal enables the mutual inductance to be formed between the current transformer and the detection coil.

2. The ground fault protection system according to claim 1, wherein the ground fault circuit interrupter is configured to calculate a duration of a residual current or the mutual inductance current received after a reset release, and output the disconnection control signal when the calculated duration is longer than a fault action delay.

3. The ground fault protection system according to claim 2, wherein an accumulated duration of the at least one pulse signal is longer than the fault action delay, the at least one pulse signal comprises a pulse signal corresponding to a positive half-cycle of the alternating current signal and a pulse signal corresponding to a negative half-cycle of the alternating current signal, an accumulated duration of the pulse signal corresponding to the positive half-cycle of the alternating current signal is shorter than the fault action delay, and an accumulated duration of the pulse signal corresponding to the negative half-cycle of the alternating current signal is shorter than the fault action delay.

4. The ground fault protection system according to claim 2, wherein the ground fault protection device further comprises a power supply module,
wherein the power supply module is configured to provide a first power supply voltage greater than or equal to a power supply voltage reset threshold to a power terminal of the ground fault circuit interrupter when the power supply module operates normally, and provide a second power supply voltage less than or equal to the power supply voltage reset threshold to the power terminal of the ground fault circuit interrupter when there is a fault in the power supply module; and
the ground fault circuit interrupter is configured to be reset when the power terminal of the ground fault circuit interrupter receives the second power supply voltage.

5. The ground fault protection system according to claim 2, wherein the ground fault protection device further comprises a power supply module which comprises a full-bridge rectifier circuit and a first RC circuit,
wherein a first input terminal of the full-bridge rectifier circuit is coupled with the hot, a second input terminal of the full-bridge rectifier circuit is coupled with the neutral, a first output terminal of the full-bridge rectifier circuit is coupled with a first terminal of the first RC circuit, and a second output terminal of the full-bridge rectifier circuit is grounded;
the first RC circuit comprises a first resistor and a first capacitor, wherein a first terminal of the first resistor is coupled with the first terminal of the first RC circuit, a second terminal of the first resistor is coupled with a first terminal of the first capacitor and a power terminal of the ground fault circuit interrupter, and a second terminal of the first capacitor is grounded; and
the ground fault circuit interrupter is configured to be reset when a voltage of the power terminal of the ground fault circuit interrupter is less than or equal to a power supply voltage reset threshold.

6. The ground fault protection system according to claim 5, wherein the full-bridge rectifier circuit comprises a first diode, a second diode, a third diode and a fourth diode,
wherein an anode of the first diode is coupled with a cathode of the second diode and the second input terminal of the full-bridge rectifier circuit, and a cathode of the first diode is coupled with a cathode of the fourth diode and the first output terminal of the full-bridge rectifier circuit;
an anode of the second diode is coupled with an anode of the third diode and the second output terminal of the full-bridge rectifier circuit; and
a cathode of the third diode is coupled with an anode of the fourth diode and the first input terminal of the full-bridge rectifier circuit.

7. The ground fault protection system according to claim 1, wherein the ground fault protection device further comprises a tripping module which comprises a silicon controlled rectifier, a fifth diode, a tripping coil and a contact switch,
wherein a gate of the silicon controlled rectifier is configured to receive the disconnection control signal, an anode of the silicon controlled rectifier is coupled with a cathode of the fifth diode, and a cathode of the silicon controlled rectifier is grounded;
an anode of the fifth diode is coupled with a first terminal of the tripping coil;
a second terminal of the tripping coil is coupled with the hot; and
the contact switch is disposed on the hot and the neutral, and configured to disconnect the connection of the hot and the neutral with the load when the tripping coil is powered on.

8. The ground fault protection system according to claim 1, wherein the detection circuit further comprises a detection module which is configured to detect whether the disconnection control signal is output by the ground fault circuit interrupter.

9. The ground fault protection system according to claim 8, wherein the detection module is configured to output a detection current in a negative half-cycle of the alternating current signal to detect whether the disconnection control signal is output by the ground fault circuit interrupter.

10. The ground fault protection system according to claim 9, wherein the ground fault protection device further comprises a tripping module which comprises a silicon controlled rectifier, a fifth diode, a tripping coil and a contact switch,
wherein a gate of the silicon controlled rectifier is configured to receive the disconnection control signal, an anode of the silicon controlled rectifier is coupled with a cathode of the fifth diode and a detection pin, and a cathode of the silicon controlled rectifier is grounded;
an anode of the fifth diode is coupled with a first terminal of the tripping coil;
a second terminal of the tripping coil is coupled with the hot;
the contact switch is disposed on the hot and the neutral, and configured to disconnect the connection of the hot and the neutral with the load when the tripping coil is powered on; and
the detection pin is configured to receive the detection current.

11. The ground fault protection system according to claim 10, wherein the detection module is configured to obtain a load resistance status of the detection pin based on the detection current, to detect whether the disconnection control signal is output by the ground fault circuit interrupter.

12. The ground fault protection system according to claim 8, wherein the detection circuit further comprises an alarming module which is configured to generate an alarm when the detection module detects that the ground fault circuit interrupter does not output the disconnection control signal.

13. The ground fault protection system according to claim 1, wherein the signal generation module comprises a zero-crossing detection module and a signal generator,
wherein the zero-crossing detection module is configured to output a zero-crossing pulse signal when a zero-crossing point of the hot relative to the neutral is detected; and
the signal generator is configured to generate the at least one pulse signal after receiving the zero-crossing pulse signal.

14. The ground fault protection system according to claim 13, wherein the detection circuit further comprises a detection module which is configured to output a detection current to detect whether the disconnection control signal is output by the ground fault circuit interrupter.

15. The ground fault protection system according to claim 1, wherein the detection circuit further comprises a controllable switch and a signal transmission line,
- wherein a control terminal of the controllable switch is configured to receive the test signal, a first connection terminal of the controllable switch is coupled with a first connection point of the signal transmission line, and a second connection terminal of the controllable switch is grounded;
- a second connection point of the signal transmission line is coupled with the second connection terminal of the controllable switch; and
- the signal transmission line between the first connection point and the second connection point penetrates through the current transformer and the detection coil.

16. The ground fault protection system according to claim 15, wherein the neutral further serves as the signal transmission line.

* * * * *